US006510470B1

(12) United States Patent
Capelli

(10) Patent No.: US 6,510,470 B1
(45) Date of Patent: Jan. 21, 2003

(54) MECHANISM ALLOWING ASYNCHRONOUS ACCESS TO GRAPHICS ADAPTER FRAME BUFFER PHYSICAL MEMORY LINEAR APERTURE IN A MULTI-TASKING ENVIRONMENT

(75) Inventor: Ronald Bruce Capelli, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,486

(22) Filed: Dec. 18, 1998

(51) Int. Cl.[7] ........................ G06F 15/163; G06F 15/16
(52) U.S. Cl. ........................ 709/323; 345/503; 345/545
(58) Field of Search ................................ 345/503, 541, 345/545; 709/323

(56) References Cited

U.S. PATENT DOCUMENTS

| | | | | | |
|---|---|---|---|---|---|
| 4,823,304 | A | * | 4/1989 | Frantz | 709/232 |
| 5,245,702 | A | * | 9/1993 | McIntyre | 345/541 |
| 5,418,962 | A | * | 5/1995 | Bodin | 710/8 |
| 5,715,459 | A | * | 2/1998 | Celi | 709/323 |
| 6,104,359 | A | * | 8/2000 | Endres | 345/589 |
| 6,240,468 | B1 | * | 5/2001 | Capelli | 710/4 |

* cited by examiner

*Primary Examiner*—Alvin Oberley
*Assistant Examiner*—Phuong Hoang
(74) *Attorney, Agent, or Firm*—Jeffrey S. LaBaw; Bracewell & Patterson, L.L.P.

(57) ABSTRACT

A module is interposed between a multitasking operating system and the device driver for a graphics adapter including a frame buffer with a linear aperture for continuous, asynchronous data transfers. The interposed module may selectively intercept all graphics device driver function requests or simply pass such requests to the device driver, and provides a mechanism for generating graphics output in the frame buffer without utilizing graphics accelerator hardware on the graphics adapter. The interposed module is aware of the start and stop of asynchronous data transfers to the frame buffer. When asynchronous data transfers are started, the interposed module invokes the graphics adapter device driver to obtain access to the frame buffer linear aperture and sets its own internal state to active. While active, the interposed module intercepts all graphics device driver requests and employs its own mechanism to generate graphics output in the frame buffer responsive to such requests, without utilizing the graphics accelerator hardware. Since the graphics accelerator hardware is not utilized, the frame buffer linear aperture always remains enabled. While inactive, the interposed module simply passes all graphics device driver requests to the device driver. The interposed module is preferably implemented in accordance with the GRADD architecture model, with the mechanism for generating graphics output being provided by the VMAN and SOFTDRAW libraries.

20 Claims, 3 Drawing Sheets

MECHANISM ALLOWING ASYNCHRONOUS ACCESS TO GRAPHICS ADAPTER FRAME BUFFER PHYSICAL MEMORY LINEAR APERTURE IN A MULTI-TASKING ENVIRONMENT

BACKGROUND OF THE INVENTION

1. Technical Field

The present invention relates in general to graphics display systems and in particular to asynchronous data transfers to graphics display systems. Still more particularly, the present invention relates to supporting asynchronous data transfers to graphics display systems concurrently with other processes generating graphics output for the frame buffer.

2. Description of the Related Art

A typical personal computer or workstation graphics system consists of a graphics adapter providing a frame buffer and graphics acceleration hardware, together with a software device driver providing an interface between the graphics adapter hardware and the operating system and/or applications running on top of the operating system. This serves to facilitate display of elaborate graphics while relieving the operating system of computational responsibility for graphics processing, improving overall performance.

In a multitasking environment, however, access to hardware devices such as the graphics adapter must be serialized so that the hardware state may be managed and maintained consistently for each process. This imposes a constraint on continuous, asynchronous data transfers from a video source such as a video capture device (e.g., “Webcam”), a digital television signal source, video streaming from a network device, and the like.

While such continuous, asynchronous data transfers should be transmitted directly to the physical memory linear aperture of the graphics adapter frame buffer via direct memory access (DMA) or other means, for many commercial graphics adapters, the frame buffer linear aperture is not accessible at the same time as the graphics accelerator hardware is being utilized. If an asynchronous data transfer is in progress when some process concurrently attempts to utilize the graphics accelerator hardware (which disables the linear aperture), the asynchronous data transfer may fail in some manner. At best this failure may be manifested as a visible glitch in the display of the asynchronous data transfer; at worst, the failure may result in system corruption and/or hang.

One solution would be to serialize (i.e. time multiplex) data transfer operations to the frame buffer linear aperture with access to the graphics accelerator hardware. However, such serialization defeats the desired asynchronous functioning of the data transfer operations concurrently with other processes in a multitasking environment.

It would be desirable, therefore, to provide a mechanism for supporting asynchronous data transfers to a frame buffer linear aperture concurrently with other processes normally utilizing the graphics adapter accelerator hardware to generate graphics output for the frame buffer.

SUMMARY OF THE INVENTION

It is therefore one object of the present invention to provide an improved graphics display system.

It is another object of the present invention to provide an improved method and system for supporting asynchronous data transfers to graphics display systems.

It is yet another object of the present invention to provide support for asynchronous data transfers to graphics display systems concurrently with other processes generating graphics output for the frame buffer.

The foregoing objects are achieved as is now described. A module is interposed between a multitasking operating system and the device driver for a graphics adapter including a frame buffer with a linear aperture for continuous, asynchronous data transfers. The interposed module may selectively intercept all graphics device driver function requests or simply pass such requests to the device driver, and provides a mechanism for generating graphics output in the frame buffer without utilizing graphics accelerator hardware on the graphics adapter. The interposed module is aware of the start and stop of asynchronous data transfers to the frame buffer. When asynchronous data transfers are started, the interposed module invokes the graphics adapter device driver to obtain access to the frame buffer linear aperture and sets its own internal state to active. While active, the interposed module intercepts all graphics device driver requests and employs its own mechanism to generate graphics output in the frame buffer responsive to such requests, without utilizing the graphics accelerator hardware. Since the graphics accelerator hardware is not utilized, the frame buffer linear aperture always remains enabled. While inactive, the interposed module simply passes all graphics device driver requests to the device driver. The interposed module is preferably implemented in accordance with the GRADD architecture model, with the mechanism for generating graphics output being provided by the VMAN and SOFTDRAW libraries.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
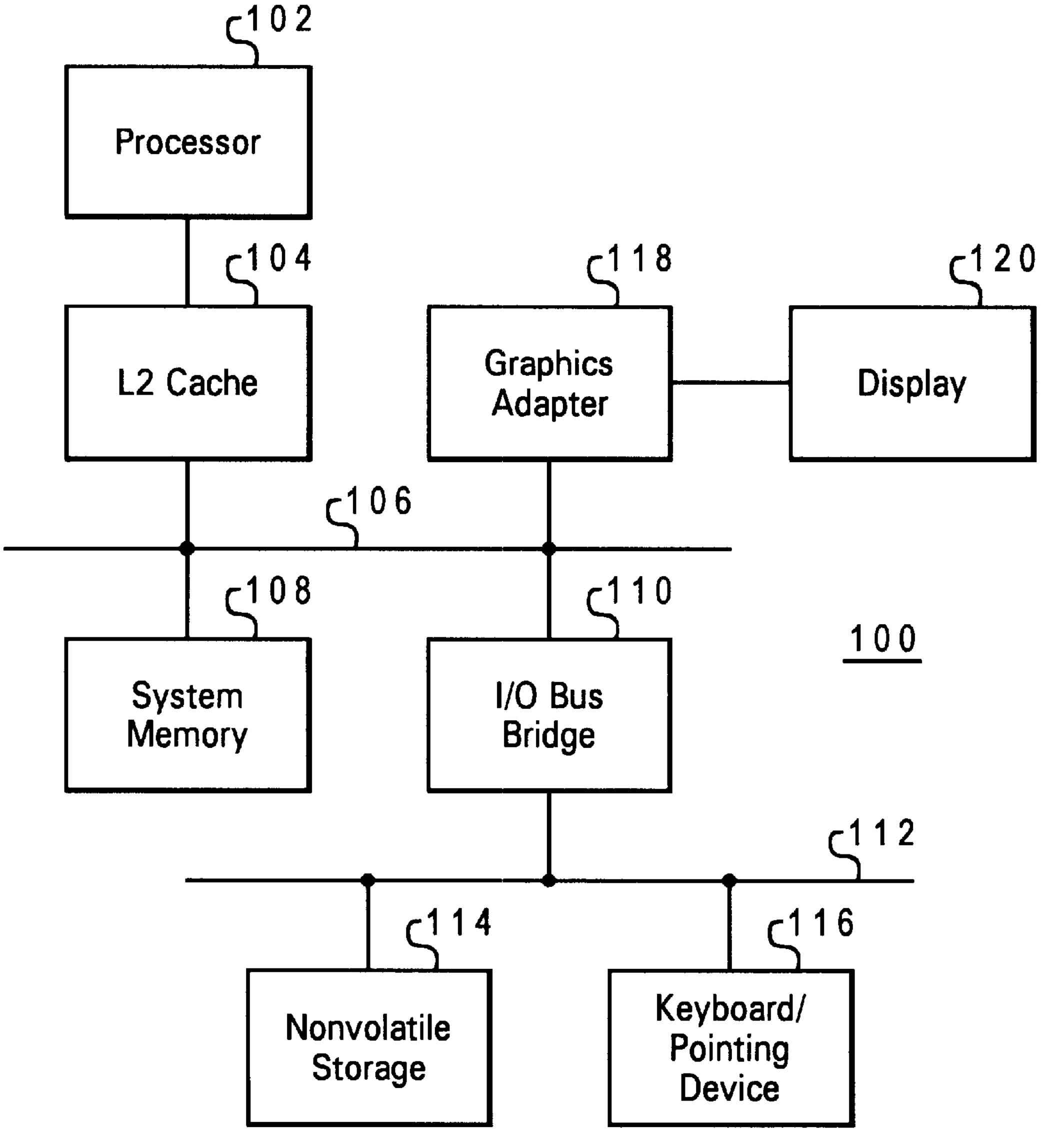
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be one of the models of personal computers available from International Business Machines Corporation of Armonk, N.Y. Data processing system 100 includes processor 102, which in the exemplary embodiment is connected to a level two (L2) cache 104, which is connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or a digitizer pad, are connected to I/O bus 112.

In a preferred embodiment, data processing system 100 includes graphics adapter 118 connected to system bus 106, receiving primitives for rendering from processor 102 and generating pixels for display 120 as described in further detail below. Graphics adapter 118 includes a frame buffer and graphics accelerator hardware which may be utilized concurrently as described in greater detail below.

Data processing system 100 preferably includes an operating system (not shown) supporting multi-tasking and an application for receiving asynchronous data transfers for display, such as a video streaming viewer. The application for receiving asynchronous data transfers may operate concurrently on graphics adapter 118 with other processes.

The exemplary embodiment shown in FIG. 1 is provided solely for the purposes of explaining the invention and those skilled in the art will recognize that numerous variations are possible, both in form and function. For instance, data processing system 100 may include a CD-ROM and/or DVD drive, or a look-up table and/or digital-to-analog converter may be implemented between graphics adapter 118 and display 120. All such variations are believed to be within the spirit and scope of the present invention.

Figure 2:
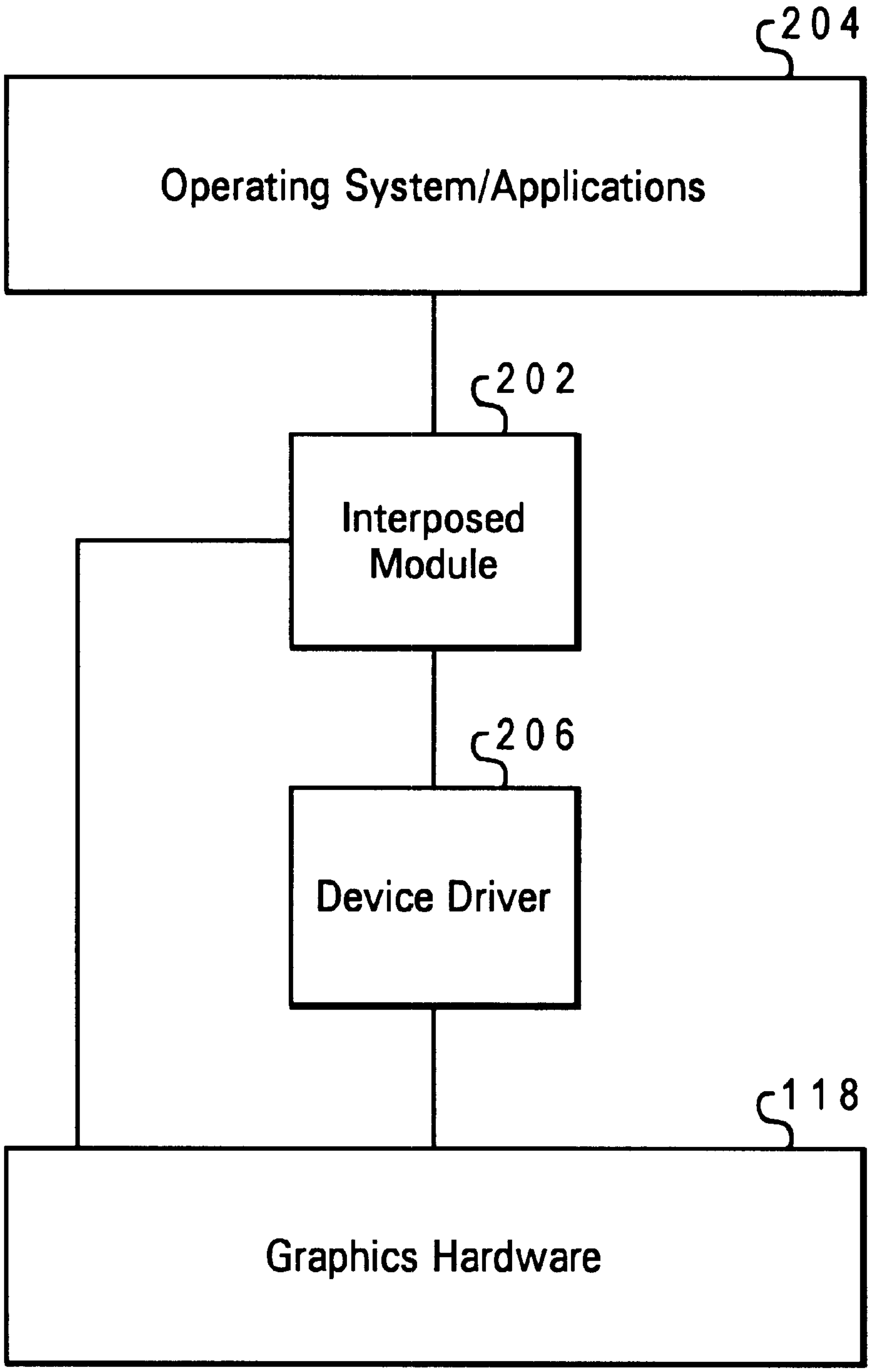
FIG. 2 is a block diagram of a graphics display subsystem supporting asynchronous data transfer to a frame buffer linear aperture concurrently with other processes generating graphics output in accordance with a preferred embodiment of the present invention.

With reference now to FIG. 2, a block diagram of a graphics display subsystem supporting asynchronous data transfer to a frame buffer linear aperture concurrently with other processes generating graphics output in accordance with a preferred embodiment of the present invention is illustrated. In the present invention, a module 202 is interposed between the operating system and applications 204 and the device driver 206 for the graphics adapter 118. The interposed module 202 may selectively intercept all graphics device driver function requests, and provides a mechanism for generating graphics output in the frame buffer without utilizing graphics accelerator hardware on graphics adapter 118. Additionally, the interposed module 202 may selectively simply pass graphics device driver requests to device driver 206.

The interposed module 202 monitors graphics device driver function requests and is aware of when asynchronous data transfers to the frame buffer are started and stopped. In fact, the interposed module 202 itself may optionally include the mechanism for starting and stopping the asynchronous data transfer. When asynchronous data transfers are started, interposed module 202 invokes graphics adapter device driver 206 to obtain access to the frame buffer linear aperture and sets its own internal state to active. A DMA mechanism may be utilized by interposed module 202 to transfer asynchronous data directly to the physical address of the graphics adapter frame buffer linear aperture, independent of the actual graphics adapter device driver 206.

While the internal state of interposed module 202 is active, interposed module 202 intercepts all graphics device driver requests and employs its own mechanism to generate graphics output in the frame buffer responsive to such requests, without utilizing the graphics accelerator hardware. Since the graphics accelerator hardware is not utilized, the frame buffer linear aperture always remains enabled.

When the asynchronous data transfer terminates, interposed module 202 sets its internal state to inactive. While inactive, the interposed module 202 simply passes all graphics device driver requests on to the actual graphics device driver, which is free to disable the frame buffer linear aperture without adverse effect.

The interposed module 202 is preferably implemented in accordance with the Graphics Adapter Device Driver (GRADD) architecture model disclosed and described in U.S. Pat. No. 5,715,459 entitled Advanced Graphics Driver Architecture, which is incorporated herein by reference. Interposed module 202 is preferably although not necessarily a GRADD filter, and the mechanism for generating graphics output in the frame buffer is provided by the video manager (VMAN) and SOFTDRAW graphics libraries associated with the GRADD architecture model and available from International Business Machines Corporation of Armonk, N.Y.

The present invention may be implemented, for instance, in a video capture and display system which exploits the GRADD model for a generic display driver solution. The video capture hardware may utilize a DMA mechanism to transfer streaming digital video to physical memory. The invention may be utilized with graphics chipsets in which the frame buffer linear aperture is disabled when concurrent processes utilize graphics accelerator functions.

Figure 3:
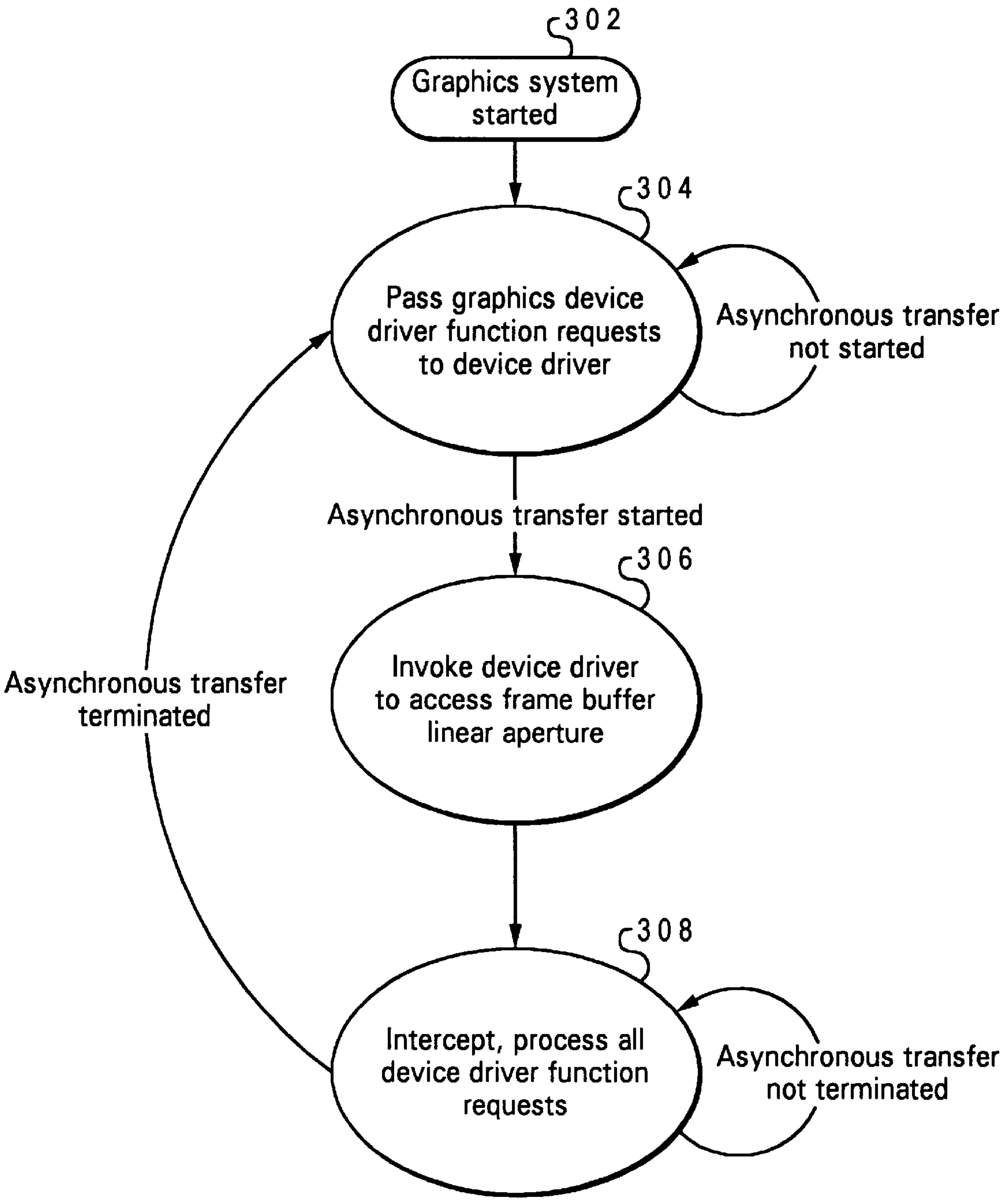
FIG. 3 depicts a high level flowchart for a process of supporting asynchronous data transfer to a frame buffer linear aperture concurrently with other processes generating graphics output in the frame buffer accordance with a preferred embodiment of the present invention.

With reference now to FIG. 3, a high level state diagram for a process of supporting asynchronous data transfer to a frame buffer linear aperture concurrently with other processes generating graphics output in the frame buffer accordance with a preferred embodiment of the present invention is depicted. The process is implemented by the data processing system and graphics display subsystem described above.

The process begins at state 302, which depicts the graphics system being started. The process next transitions to state 304, which illustrates an interposed module at the interface of a device driver simply passing all received graphics device driver function requests to the device driver. The process remains in state 304 until an asynchronous data transfer is initiated, which may be detected by the interposed module and may result in a change in the internal state of the interposed module as described above. As long no asynchronous data transfer has been started, the process remains in state 304.

Once an asynchronous data transfer is initiated, the process transitions first to state 306, which depicts the interposed module invoking the device driver to access the frame buffer linear aperture for the asynchronous data transfer, and next to state 308, which depicts the interposed module intercepting and processing—with the mechanism for processing graphics device driver function requests within the interposed module as described above—all graphics adapter device driver function requests. This precludes the accelerator hardware on the graphics adapter from being utilized, preventing the frame buffer linear aperture from being disabled.

As long as the asynchronous data transfer is progressing, the process remains in state 308. Once the asynchronous data transfer terminates, however, the process transitions back to state 304, and resumes passing all graphics device driver function requests to the device driver, again accompanied by an internal state change within the interposed module. The process remains in state 304 until a subsequent asynchronous data transfer is initiated.

The present invention provides a generic, device-independent method of permitting asynchronous data transfers from a digital video source to the graphics adapter frame buffer concurrently with other processes generating graphics output in the frame buffer, while known implementations are either device dependent or utilize time-multiplexing. For example, a device driver for video capture hardware is typically integrated with or tightly coupled to the graphics display hardware device driver. The present invention, however, decouples the video source driver from the graphics display device driver, providing a generic and device independent solution which reduces costs together with true asynchronous, concurrent operations and potentially improved performance.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of supporting asynchronous data transfers concurrently with other processes generating graphics output in a frame buffer, comprising:

determining whether any asynchronous data transfer to a frame buffer linear aperture for a graphics adapter is in progress;

responsive to determining that no asynchronous data transfer to the frame buffer linear aperture is in progress, passing a received graphics device driver function request to a device driver for the graphics adapter; and responsive to determining that an asynchronous data transfer to the frame buffer linear aperture is in progress, intercepting the received graphics device driver function request and processing the received graphics device driver request without utilizing accelerator hardware for the graphics adapter.

2. The method of claim 1, wherein the step of determining whether an asynchronous data transfer to a frame buffer linear aperture for a graphics adapter is in progress further comprises:

checking an internal state of a module interposed between an operating system and the device driver for the graphics adapter.

3. The method of claim 1, wherein the step of passing a received graphics device driver function request to a device driver for the graphics adapter further comprises:

passing all received graphics device driver function requests to the device driver for the graphics adapter while no asynchronous data transfer to the frame buffer linear aperture is progressing.

4. The method of claim 1, wherein the step of intercepting the received graphics device driver function request and processing the received graphics device driver request without utilizing accelerator hardware for the graphics adapter further comprises:

intercepting all received graphics device driver function requests to the device driver for the graphics adapter while the asynchronous data transfer to the frame buffer linear aperture is progressing and processing the intercepted device driver function requests without utilizing accelerator hardware for the graphics adapter.

5. The method of claim 1, further comprising:

interposing a module between an operating system and the device driver for the graphics adapter, the interposed module detecting initiation of any asynchronous data transfers to the frame buffer linear aperture.

6. The method of claim 5, further comprising:

invoking the device driver for the graphics adapter with the interposed module to access the frame buffer linear aperture.

7. The method of claim 1, further comprising:

interposing a module between an operating system and the device driver for the graphics adapter, the interposed module detecting the termination of any asynchronous data transfers to the frame buffer linear aperture.

8. A system for supporting asynchronous data transfers concurrently with other processes generating graphics output in a frame buffer, comprising:

a device driver for a graphics adapter;

a source of asynchronous data for a frame buffer linear aperture or graphics device driver function requests for the device driver; and a module interposed between the device driver and the source, the interposed module:

determining whether any asynchronous data transfer to a frame buffer linear aperture for the graphics adapter is in progress;

responsive to determining that no asynchronous data transfer to the frame buffer linear aperture is in progress, passing a graphics device driver function request to the device driver; and responsive to determining that an asynchronous data transfer to the frame buffer linear aperture is in progress, intercepting the graphics device driver function request and processing the received graphics device driver request without utilizing accelerator hardware for the graphics adapter.

9. The system of claim 8, wherein the interposed module checks an internal state to determine whether an asynchronous data transfer is in progress.

10. The system of claim 8, wherein the interposed module is set to a first internal state upon initiation of an asynchronous data transfer to the frame buffer linear aperture.

11. The system of claim 10, wherein the interposed module is set to a second internal state upon termination of the asynchronous data transfer to the frame buffer linear aperture.

12. The system of claim 8, wherein the interposed module passes all graphics device driver function requests to the device driver when no asynchronous data transfer to the frame buffer linear aperture is progressing.

13. The system of claim 8, wherein the interposed module intercepts all graphics device driver function requests while the asynchronous data transfer to the frame buffer linear aperture is progressing and processes the intercepted device driver function requests without utilizing accelerator hardware for the graphics adapter.

14. The system of claim 8, wherein the interposed module invokes the device driver for the graphics adapter to access the frame buffer linear aperture during initiation of an asynchronous data transfer to the frame buffer linear aperture is progressing.

15. A computer program product within a computer usable medium for supporting asynchronous data transfers concurrently with other processes generating graphics output in a frame buffer, comprising:

instructions for determining whether any asynchronous data transfer to a frame buffer linear aperture for a graphics adapter is in progress;

instructions, responsive to determining that no asynchronous data transfer to the frame buffer linear aperture is in progress, for passing a received graphics device driver function request to a device driver for the graphics adapter; and instructions, responsive to determining that an asynchronous data transfer to the frame buffer linear aperture is in progress, for intercepting the received graphics device driver function request and processing the received graphics device driver request without utilizing accelerator hardware for the graphics adapter.

16. The computer program product of claim 15, wherein the instructions for determining whether an asynchronous data transfer to a frame buffer linear aperture for a graphics adapter is in progress further comprise:

instructions for checking an internal state of a module interposed between an operating system and the device driver for the graphics adapter.

17. The computer program product of claim 15, wherein the instructions for passing a received graphics device driver function request to a device driver for the graphics adapter further comprise:

instructions for passing all received graphics device driver function requests to the device driver for the graphics adapter while no asynchronous data transfer to the frame buffer linear aperture is progressing.

18. The computer program product of claim 15, wherein the instructions for intercepting the received graphics device driver function request and processing the received graphics device driver request without utilizing accelerator hardware for the graphics adapter further comprise:

instructions for intercepting all received graphics device driver function requests to the device driver for the graphics adapter while the asynchronous data transfer to the frame buffer linear aperture is progressing and processing the intercepted device driver function requests without utilizing accelerator hardware for the graphics adapter.

19. The computer program product of claim 15, further comprising:

instructions for detecting initiation of any asynchronous data transfers to the frame buffer linear aperture at a module interposed between an operating system and the device driver for the graphics adapter.

20. The computer program product of claim 19, further comprising:

instructions for invoking the device driver for the graphics adapter with the interposed module to access the frame buffer linear aperture upon initiation of an asynchronous data transfer to the frame buffer linear aperture.

* * * * *